United States Patent [19]

Mizunaga et al.

[11] Patent Number: 4,950,031
[45] Date of Patent: Aug. 21, 1990

[54] AUTOMOBILE REAR UNDERBODY STRUCTURE

[75] Inventors: Sumiaki Mizunaga; Katsuaki Matsui; Hiroaki Kodama; Makoto Tokuda; Morikazu Sakamoto, all of Hiroshima, Japan

[73] Assignee: Mazda Motor Corporation, Hiroshima, Japan

[21] Appl. No.: 213,227

[22] Filed: Jun. 29, 1988

[30] Foreign Application Priority Data

Jul. 4, 1987 [JP] Japan .............................. 62-103051[U]
Oct. 16, 1987 [JP] Japan ................................. 62-261038
Oct. 29, 1987 [JP] Japan ............................ 62-165735[U]

[51] Int. Cl.$^5$ ............................................. B60R 27/00
[52] U.S. Cl. .................................... 296/189; 296/204; 296/195; 293/155
[58] Field of Search ............... 296/188, 189, 203, 204, 296/185, 195; 293/155, 120, 121

[56] References Cited

U.S. PATENT DOCUMENTS

| 3,084,971 | 4/1963 | Schilberg | 296/203 |
| 3,848,886 | 11/1974 | Feustel et al. | 293/134 X |
| 4,533,166 | 8/1985 | Stokes | 293/120 |
| 4,684,151 | 8/1987 | Drewek | 296/189 X |

FOREIGN PATENT DOCUMENTS

| 2148108 | 9/1971 | Fed. Rep. of Germany . | |
| 2313588 | 3/1973 | Fed. Rep. of Germany . | |
| 2840689 | 3/1980 | Fed. Rep. of Germany . | |
| 355450 | 1/1938 | Italy | 296/203 |
| 56-143949 | 10/1981 | Japan . | |
| 29572 | 2/1984 | Japan | 296/188 |
| 60-6360 | 2/1985 | Japan . | |
| 20765 | 1/1987 | Japan | 296/188 |

Primary Examiner—Margaret A. Focarino
Assistant Examiner—Gary C. Hoge
Attorney, Agent, or Firm—Wenderoth, Lind & Ponack

[57] ABSTRACT

An automobile rear underbody structure which comprises generally elongated side frames extending in a direction lengthwise of an automobile body structure and each having a front and rear frame portions. The rear frame portion of each side frame lies in a level offset upwardly relative to the front frame portion. The rear frame portion has a depressed zone defined at a predetermined position thereof to permit the rear frame portion to bend downwardly when an external impact greater than a predetermined value is applied thereto.

30 Claims, 8 Drawing Sheets

AUTOMOBILE REAR UNDERBODY STRUCTURE

BACKGROUND OF THE INVENTION

1. Field of the Invention

The present invention generally relates to an automobile underbody structure and, more particularly, to a rear underbody structure where a rear bumper is installed.

2. Description of the Prior Art

A compact station wagon of a type wherein three seat assemblies are installed inside the compartment, front, intermediate and rear seat assemblies, is now gaining a popularity in the market. In this three-seat model, opposite side frames or sills extending longitudinally of the automobile body structure and laterally spaced have their rear portions bent so as to extend at a level offset upwardly relative to front portions thereof, and the rear seat assembly is installed atop the upwardly offset rear portions of the side frames.

With this three-seat station wagon, it has been found that the presence of respective slantwise portions, or kick-up regions, of the side frames intermediate between the front and rear portions tends to facilitate upward buckling of the upwardly offset rear portions of the side frames relative to the front portions of the side frames, rather than allowing them to buckle downwards, when an impact of a value greater than a predetermined value is applied from the rear to the upwardly offset rear portions of the side frames as a result of a rear-end collision.

The impact resulting from the rear-end collision is generally applied axially to the side frames as discussed in the Japanese Laid-open Utility Model Publication No. 61-124441 published in 1986. However, in a compact station wagon, or any other automobile such as a van, particularly a front-engine rear-drive model, of the type wherein the offset amount of each rear portion of the side frames offset upwardly relative to the associated front portion of the side frame is relatively great for accommodating the associated rear wheel suspension system and, also, a rear bumper is required to be fitted at a relatively low level for the purpose of the automobile body style, the necessity often arises that the rear bumper be fitted offset upwardly relative to bumper brackets through which the impact is transmitted to the respective side frames. Accordingly, in those types of automobiles, means are necessitated to avoid any possible reduction in height between the floor panel and the roof which would otherwise result from the upward buckling of the rear portions of the side frames as discussed above.

To minimize the upward buckling of the rear portions of the side frames in the event of a rear-end collision, each of the side frames has hitherto been reinforced by providing the respective side frame with a sufficient wall thickness and/or by fitting an extra skeletal member to the respective side frame. The use of the side frames having increased wall thicknesses and/or reinforced by the extra skeletal members results in the increased weight of the automobile and also increased manufacturing cost thereof.

Apart from the problem associated with the side frames discussed above, the Japanese Laid-open Utility Model Publication No. 56-143949, published Oct. 30, 1981, discloses a rear bumper for use in an automobile of the type having a back door hinged to a rear edge portion of the roof for selective movement between open and closed positions, for example, that of station wagon, hatchback or van. According to this publication, a rearmost cross member extending between rear frames or sills at the rear of the automobile is fitted with a sealing member operable to seal a gap between the back door and the automobile rear underbody structure when the back door is moved to the closed position. The invention disclosed in this publication is characterized in that the sealing member is an integral part of the rear bumper. The rear bumper having the sealing member is fitted to rear frame extension members, which are separate from the spaced apart side frames or sills forming parts of the automobile underbody structure and which are therefore rigidly secured to respective rear ends of the side frames or sills.

It has, however, been found that the rear underbody structure disclosed in the Japanese publication, referred to above, in combination with the respective bumper structure has some problems which will now be discussed.

In the case of a station wagon, hatchback, van or any other type of automobile having a back door for the rear access opening leading into the rear compartment or luggage room, a rear-end collision often brings about detrimental damage to the automobile. While the primary function of the rear bumper is to minimize the damage to the automobile rear body structure, the integration of the sealing member, which also functions as a weatherstrip, with the rear bumper such as disclosed in the second mentioned Japanese publication, is apt to bring about a problem in that application of even a slight impact force as a result of a rear-end collision may destroy the sealability of the rear access opening.

The integration of the sealing member with the rear bumper may reduce not only the manufacturing cost which would be incurred in making the sealing member and the rear bumper separately, but also the number of steps necessary to install the sealing member and the rear bumper to the automobile rear body structure. However, any possible deformation of the rear bumper is accompanied directly by corresponding deformation of the sealing member.

The Japanese Laid-open Utility Model Publication No. 60-6360, published Feb. 28, 1985, discloses a rear bumper assembly for use in an automobile comprising a bumper surfacing of generally U-shaped cross-section, a generally elongated bumper reinforcement or stay made of fiber reinforced synthetic resin and an impact absorbing member of generally honeycomb-shaped structure sandwiched between the bumper surfacing and the bumper stay. This rear bumper assembly is fitted to spaced apart rear frame extensions of respective side frames, which form parts of the automobile underbody structure and which extend outwardly and rearwardly from the rear of the automobile body structure, and are positioned offset upwardly relative to the rear frame extensions.

The upwardly offset disposition of the rear bumper assembly relative to the rear frame extensions disclosed in the last-mentioned publication appears to have a problem in that the rear bumper assembly is apt to be displaced upwardly in the event of a rear-end collision. This is particularly true where the automobile rear underbody structure is of a design wherein a rear portion of each of the side frames is bent so as to extend at a level offset upwardly relative to the opposite front portion of the respective side frame for the purpose of accommodating a respective rear wheel suspension system and the associated rear wheel.

SUMMARY OF THE INVENTION

The present invention has therefore been devised with a view to substantially eliminating the above-discussed problems and inconveniences inherent in the prior art rear underbody structure of an automobile and has for its essential object to provide an improved automobile rear underbody structure, wherein means are provided in each of the side frames to permit the upwardly offset rear portions of the side frames to buckle downwardly relative to the front portions thereof in the event that, as a result of a rear-end collision, a relatively severe impact is applied to the side frames.

Another important object of the present invention is to provide an improved automobile rear underbody structure of the type referred to above, wherein the side frames are effective to resist against any possible load which would, in the event of a rear-end collision, act on the side frames to deform them upwardly.

A further object of the present invention is to provide an improved automobile rear underbody structure effective to preserve the performance of the sealing member even though a substantially severe impact is applied to the rear bumper.

In order to accomplish the above described objects of the present invention, there is provided an automobile rear underbody structure which comprises generally elongated side frames extending in a direction lengthwise of an automobile body structure and each having front and rear frame portion. The rear frame portion of each side frame lies at a level offset upwardly relative to the front frame portion. The rear frame portion has a depressed zone defined at a predetermined position thereof so that the rear frame portion can, at the depressed zone, bend downwardly relative to the front frame portion when an external impact greater than a predetermined value is applied thereto, such as occurs at the time of a rear-end collision.

In this construction according to the present invention, when an external impact greater than the predetermined value is applied to the rear bumper as a result of, for example, an automobile rear-end collision, the side frames can be positively buckled downwardly in the presence of the depressed zone, thereby to avoid any possible reduction in height of the rear passenger compartment which would otherwise take place if the side frames are buckled upwardly.

BRIEF DESCRIPTION OF THE DRAWINGS

These and other objects and features of the present invention will become clear from the following description taken in conjunction with preferred embodiments thereof with reference to the accompanying drawings, in which like parts are designated by like reference numerals and in which.

DETAILED DESCRIPTION OF THE EMBODIMENTS

Figure 1:
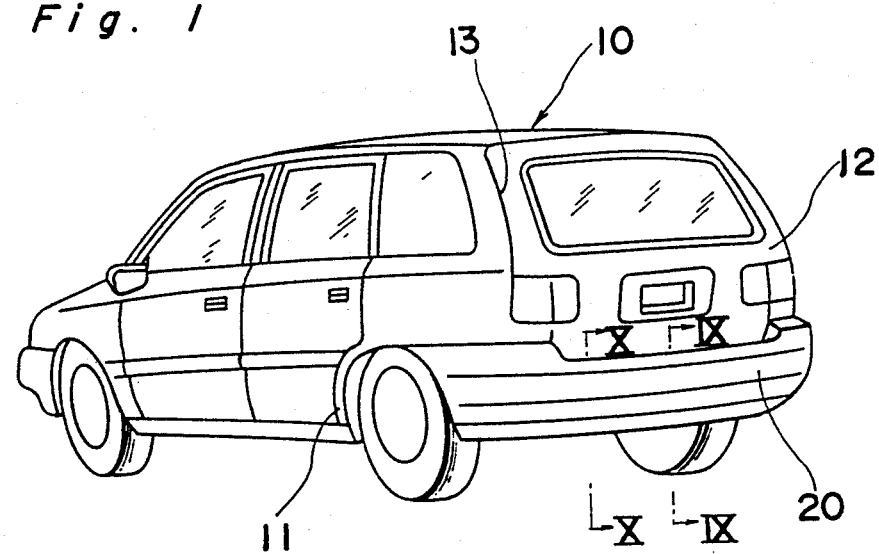
FIG. 1 is a perspective view of a compact station wagon as viewed from the rear showing the application of the present invention.

Referring first to FIG. 1, there is schematically shown a self-propelled station wagon 10 comprising an automobile body 11 having a rear access opening 13 of generally rectangular configuration defined at a rear portion of the body 11. This rear access opening 13 is adapted to be selectively closed and opened by a rear door assembly 12 hinged at an upper edge portion to a rear end of the roof. The automobile 10 is also shown as having a rear bumper 20 positioned generally beneath the rear door assembly 12 and fitted to an automobile rear underbody structure which will be described later.

As shown in FIGS. 2 to 5, the automobile rear underbody structure comprises a pair of laterally spaced side frames of sills extending from front to rear of the automobile 10, only one of which is shown and generally identified by 14. The side frames 14 support thereon a floor panel 2 rigidly secured thereto, and have rear frame portions 14b bent so as to extend at a level offset upwardly relative to front frame portions 14a for accommodating rear wheels 3 and their associated parts, including rear wheel suspension systems, while rear seat assembly 4 is installed atop the upwardly offset rear frame portions 14b through the floor panel 2.

More specifically, each of the side frames 14 has a generally U-shaped cross-section opening upwardly, the opening of the respective side frame 14 being closed by the floor panel 2 to permit the respective side frame to have a generally closed hollow interior. A portion of each side frame 14 extending between the relatively downwardly offset front frame portion 14a and the relatively upwardly offset rear frame portion 14b represents a kick-up region extending slantwise for the purpose which has been discussed hereinbefore. A rear cross member 15 is secured to rear ends of the respective rear frame portions 14b and has spaced apart rear extension arms 27 protruding rearwardly therefrom generally in alignment with the longitudinal axes of the rear frame portions 14b.

Each of the rear extension arms 27 protrudes rearwardly from the rear cross member 15 a distance greater than that over which each of the bumper stays 18, positioned immediately below the respective rear extension arms 27 and used to connect the bumper 20 to the rear underbody structure, and which protrude rearwardly from an associated bracket assembly 17.

Figure 2:
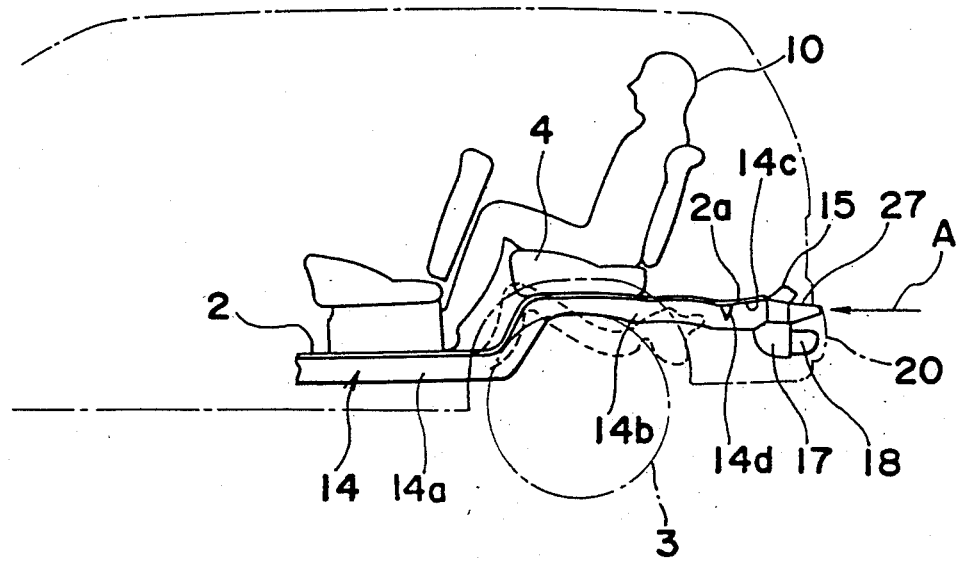
FIG. 2 is a schematic diagram, as viewed from one side of the automobile, showing the position of a third seat assembly in a compact station wagon utilizing the rear underbody structure according to a first preferred embodiment of the present invention.
Figure 3:
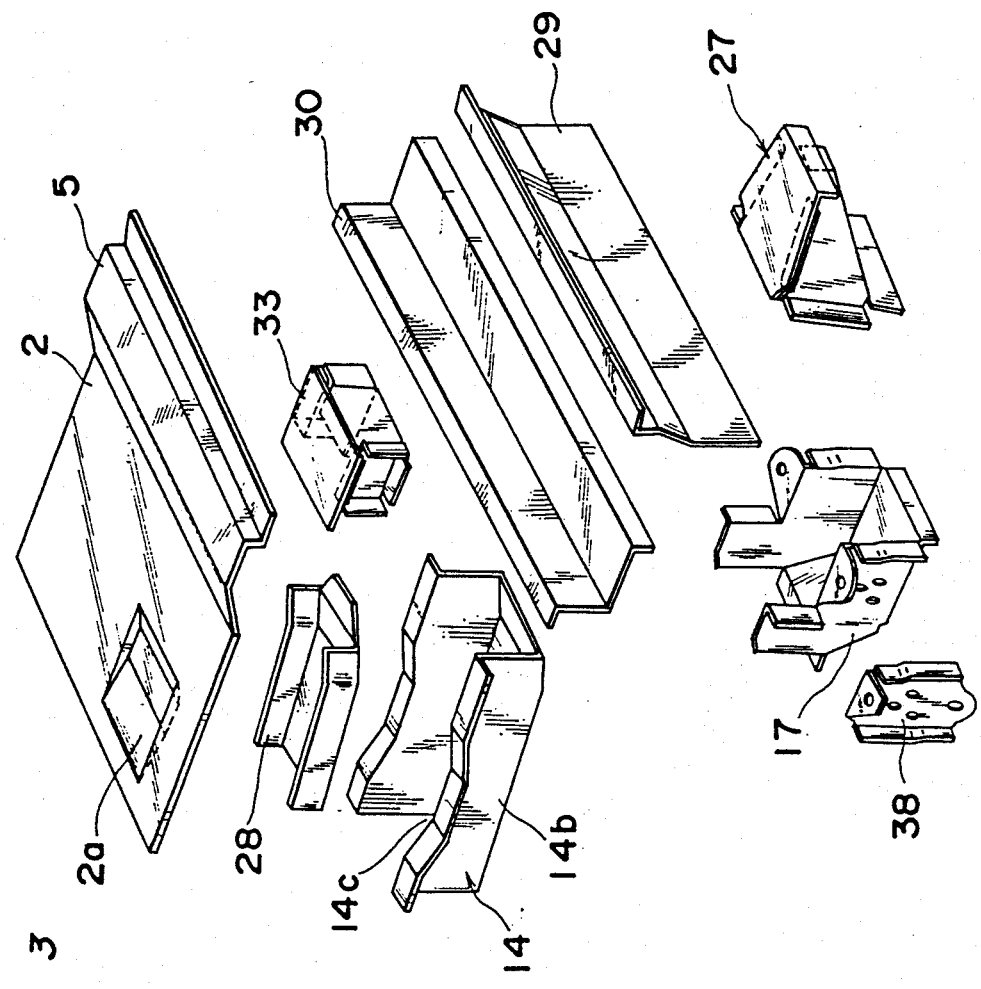
FIG. 3 is an exploded view, on an enlarged scale, of one side portion of the rear underbody structure shown in FIG. 2.
Figure 4:
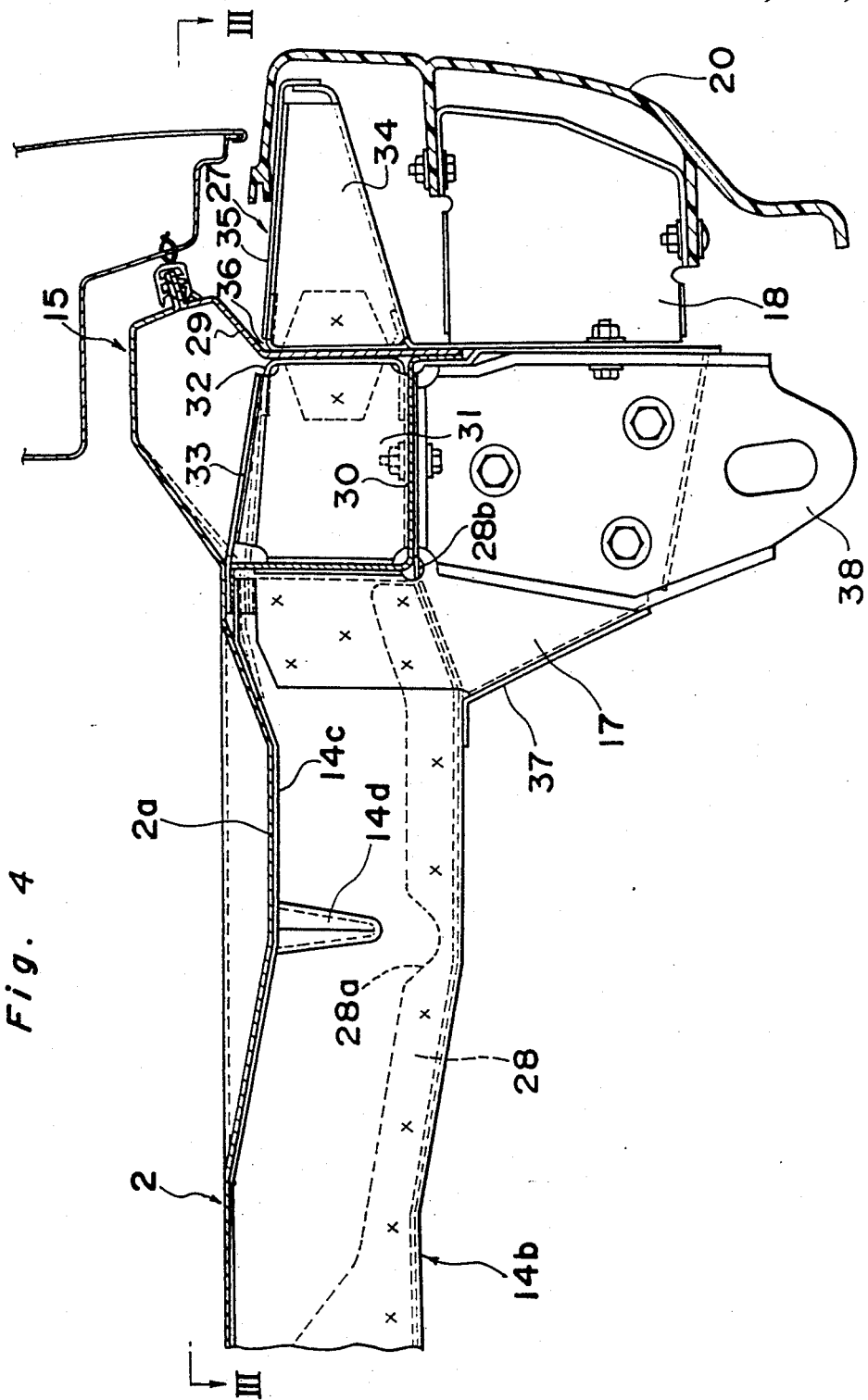
FIG. 4 is a cross-sectional side view of the rear underbody structure shown in FIG. 3.

As best shown in FIGS. 2 to 4, the rear frame portions 14b are depressed at 14c so that, in the event that the severe impacts are applied to the side frames 14 through the associated rear extension arms 27 in a direction generally axially thereof as shown by the arrow A in FIG. 2 as a result of a rear-end collision, regions 14c where the respective depressions are formed can be positively buckled downwards, rather than buckling upwards. This will minimize or substantially eliminate the possibility that the rear frame portions 14b themselves may be forced to bend upwards over the entire length thereof. Thus, the presence of the depressed regions 14c in the rear frame portions 14b is effective to allow only those regions 14c of the rear frame portions 14b to buckle downwards without substantially reducing the height of the passenger's compartment above the rearmost seat assembly 4. Even though a region of each of the rear frame portions 14c in the vicinity of the kick-up region may be shifted upwardly upon the downward buckling of the associated depressed region 14c, the amount of such upward shift is very small as compared with the case in which no depressed region is formed in the rear frame portions 14b and, therefore, the height of the passenger's compartment above the rearmost seat assembly 4 will not be unreasonably reduced.

In correspondence with the presence of the depressed regions 14c in the rear frame portions 14b, respective portions of the floor panel 2 in register with the depressed regions 14c are similarly depressed to provide a recess 2a.

Figure 5:
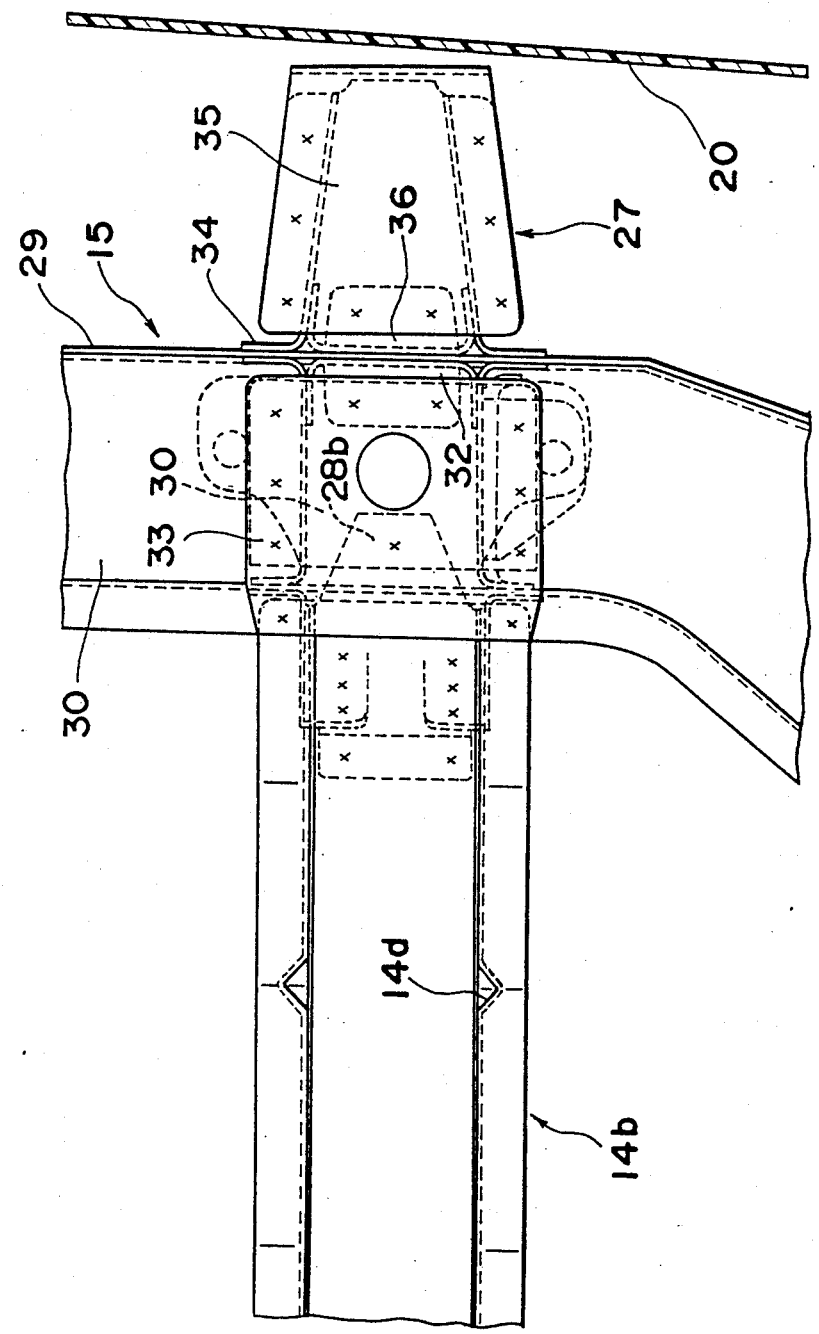
FIG. 5 is a top plan view of the rear underbody structure shown in FIG. 3.

In order to facilitate the positive downward buckling of the rear frame portions 14b at those depressed regions 14c, that portion of each of opposite side walls which is encompassed by the associated depressed region 14c is partially lanced, or otherwise pressed, so as to protrude laterally outwards to thereby form a guide pleat or bead 14d of generally V-shaped cross-section as clearly shown in FIG. 5. Each pleat or bead 14d extends from an upper edge of the associated side wall of the rear frame portion 14b inwardly thereof and terminates at a position generally intermediate of the width of that side wall of the rear frame portion 14b while depicting a shape generally similar to the shape of a figure "V" as shown in FIG. 4.

As best shown in FIGS. 3 and 4, each of the rear frame portions 14b has a generally U-shaped frame reinforcement 28 disposed therein while following the contour of the associated rear frame portion 14b, which is curved due to the presence of the depressed region 14c. This frame reinforcement 28 includes a generally rectangular plate and a pair of oppositely-disposed flanges lying perpendicular to the rectangular plate, and is disposed within the associated rear frame portion 14c with the rectangular plate held in contact with the bottom of that rear frame portion 14c and with the flanges spot-welded to the opposite side walls of that rear frame portion 14c.

The use of the frame reinforcement 28 for each rear frame portion 14b is not always essential in the practice of the present invention, however, it may increase the rigidity of the rear frame portion 14b. Where the frame reinforcement 28 is employed such as in the embodiment shown, it is essential for the frame reinforcement 28 to follow the contour of the associated rear frame portion 14b, particularly at a region 28a immediately below the guide pleat or bead 14d.

The rear cross member 15 secured to the rear ends of the rear frame portions 14b is constituted by a rear end portion of the floor panel 2, an outer panel 29 and an inner panel 30 all connected together to define a generally closed hollow. Within the closed hollow in the rear cross member 15 and immediately behind the rear end of each of the rear frame portions 14b, there is disposed a first reinforcement 31 of generally U-shaped cross-section, as viewed in a direction lengthwise of the automobile, rigidly joined to the inner panel 30, a second reinforcement 32 jointed to the first reinforcement 31 and also to the outer panel 29, and a third reinforcement 33 jointed to the first reinforcement 31, the second reinforcement 32, the inner panel 30 and the floor panel 2. With these first to third reinforcements 31, 32 and 33, generally box-like knots are formed inside the closed hollow of the rear cross member 15.

Each of the rear extension arms 27 in the embodiment shown in FIGS. 3 to 5 is provided immediately behind the associated box-like knot in the rear cross member 15 and is constituted by a lower plate member 34 of generally U-shaped cross-section, as viewed in a direction lengthwise of the automobile, an upper plate member 35 mounted atop the lower plate member 34 and jointed to upper and rear ends of the lower plate member 34, and a support plate member 36 jointed to the lower plate member 34, the upper plate member 35 and the outer panel 29, all of said plate members 34, 35 and 36 being assembled together to render the respective rear extension arm 27 to represent a shape generally similar to the shape of a pyramid frustrum tapering in a direction outwardly from the rear cross member 15. Preferably, the cross-section at one end of each rear extension arm 27 closest to the rear cross member 15 is substantially similar in shape to that at the rear end of the associated rear frame portion 14b while sharing a coaxial relationship with each other.

Each of the bracket assemblies 17 connecting the rear end of the associated rear frame portion 14b, the rear cross member 15 and the associated bumper stay 18 together is rigidly secured to the opposite side walls of that rear frame portion 14b, the inner panel 30 of the rear cross member 15 and a front end of the associated bumper stay 18 remote from the bumper 20. A corner plate 37 is secured in part to a front portion of each bracket assembly 7 and in part to the bottom wall of each rear frame portion 14b thereby to reinforce the connection between the rear frame portion 14 and the bracket assembly 7. It is to be noted that two bumper stays 18 referred to above are utilized and are used to connect the rear bumper 20 to the rear of the automobile body structure.

A rear end 28b of each reinforcement 28 disposed inside the closed hollow of the associated rear frame portion 14b as hereinbefore described protrudes outwardly from that rear frame portion 14b and into the rear cross member 15 and is jointed to the inner panel 30 of the rear cross member 15. At least one anchor plate 38 is rigidly secured to a side wall of one of the bracket assemblies 17.

The rear underbody structure according to the first embodiment shown in and described with reference to FIGS. 3 to 5 functions in the following manner.

While the condition to which the side frames 14 of the rear underbody structure are presumed to be deformed as a result of the rear-end collision is shown by the phantom line in FIG. 2, the impacts produced during a rear-end collision are applied as buckling loads to the rear ends of the rear frame portions 14b. This is due to the knots being formed inside the closed hollow of the rear cross member 15 at respective locations immediately behind the rear frame portions 14b, and since the rear extension arms 27 protrude rearwardly from the rear cross member 15 in alignment with the respective knots in the rear cross member 15 and also in coaxially aligned relationship with the respective rear frame portions 14b. However, the fact that the rear frame portions 14b are so curved and so shaped as to have the depressed region 14c and, at the same time, as to have the guide pleats or beads 14d rendering the upper edges of the rear frame portions 14b to have respective regions of discontinuity, permits stresses, induced by the application of the buckling forces, to be set up at those regions of the rear frame portions 14b where the depression is formed, eventually causing the rear frame portions 14b to positively buckle downwards relative to the front frame portions 14a. Even though each rear frame portion 14b is provided with the associated reinforcement 28, the positive downward buckling of the rear frame portion 14b can take place because the reinforcement 28 is also so curved and so shaped as to follow the contour of the associated rear frame portion 14b as hereinbefore detailed.

Figure 6:
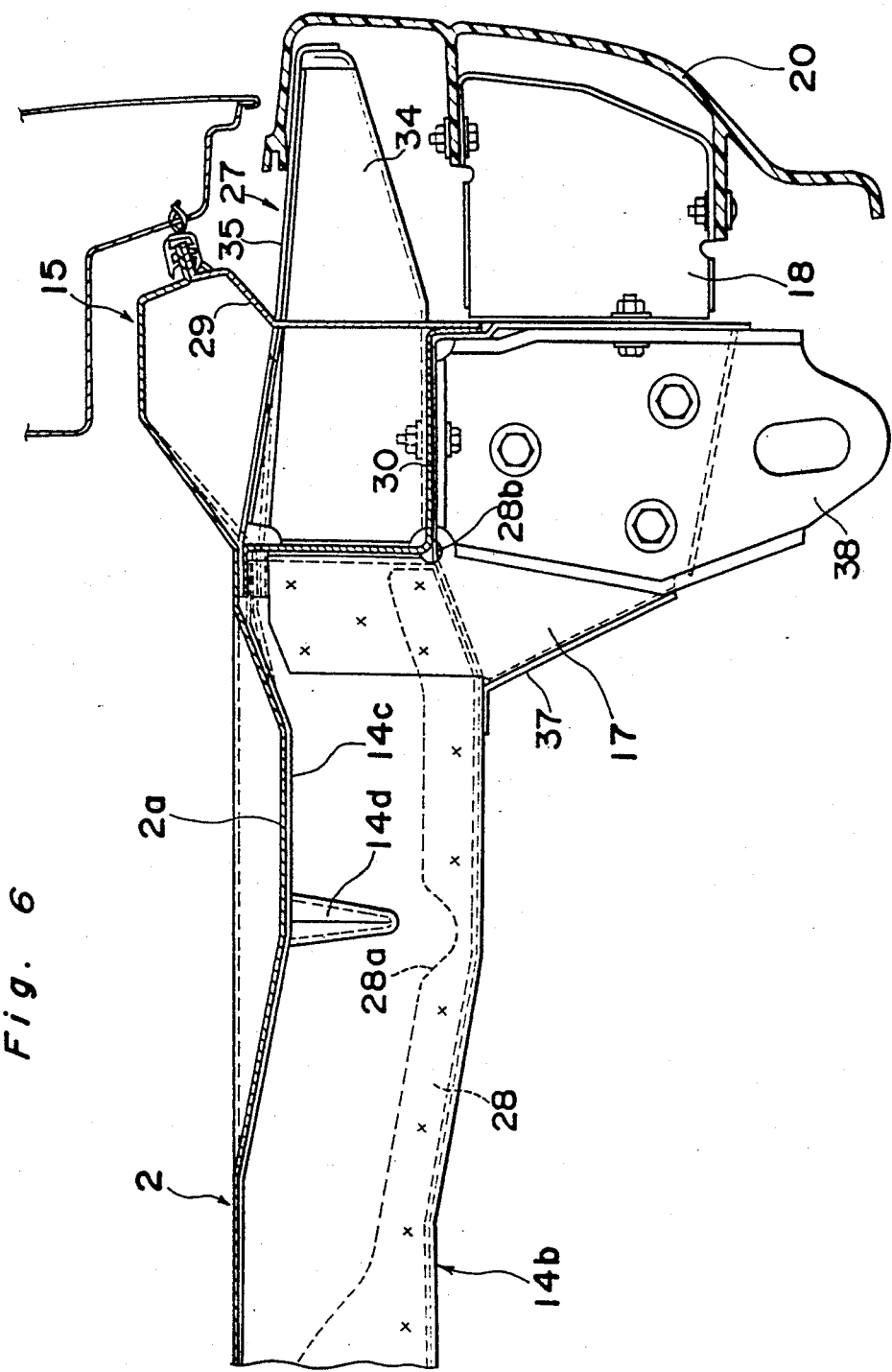
FIG. 6 is a view similar to FIG. 4, showing a modified form of the rear underbody structure.
Figure 7:
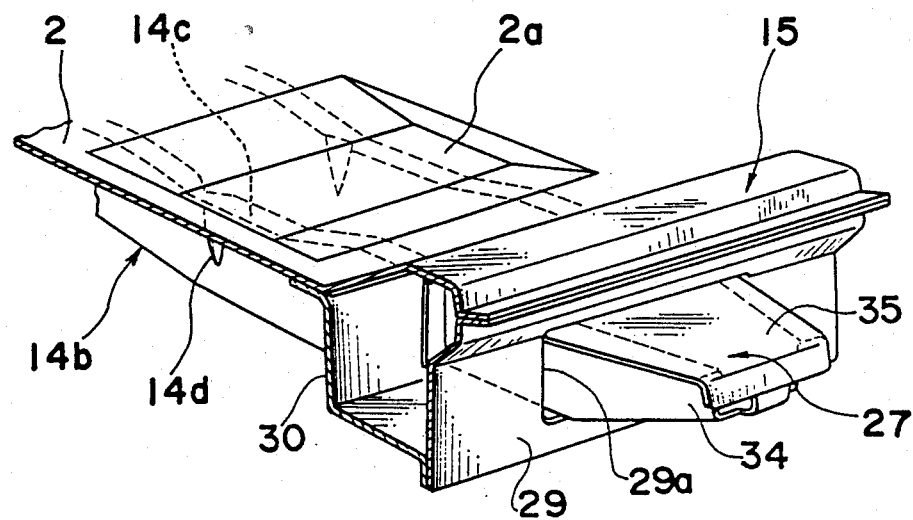
FIG. 7 is a perspective view of the rear underbody structure shown in FIG. 6.

FIGS. 6 and 7 illustrate a modified form of the rear underbody structure according to the embodiment of FIGS. 3 to 5. In this modification, instead of the employment of the knots within the rear cross member 15 which are delimited by the first, second and third reinforcements 31, 32 and 33 in the embodiment of FIGS. 3 to 5, the outer panel 29 of the rear cross member 15 is formed with an opening 29a for the passage of the associated rear extension arm 27 therethrough. The rear underbody structure according to this modification functions in a substantially similar manner to that of the foregoing embodiment.

Figure 8:
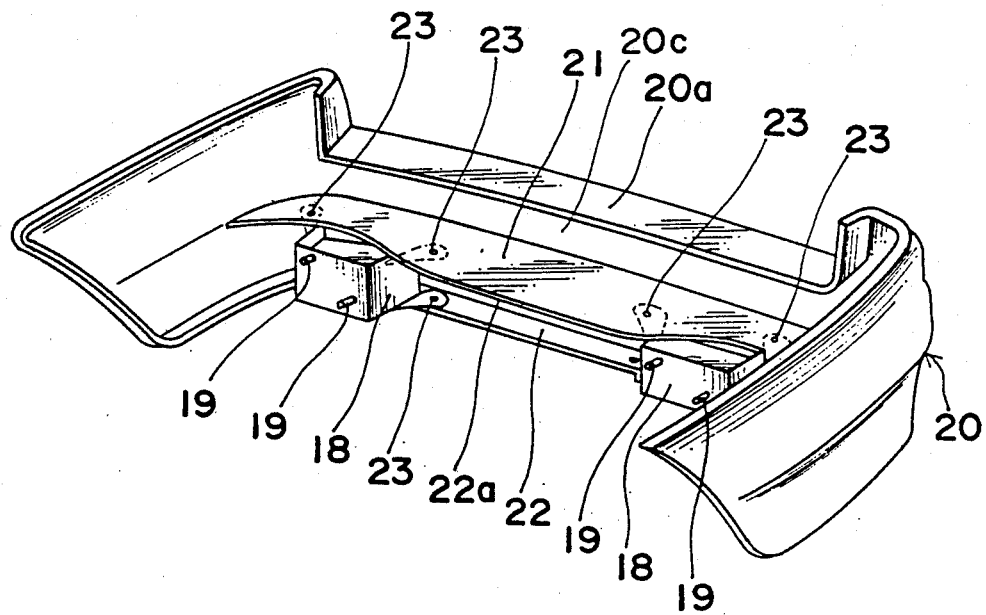
FIG. 8 is a perspective view, on an enlarged scale, of a rear bumper assembly used in the rear underbody structure according to the present invention.
Figure 9:
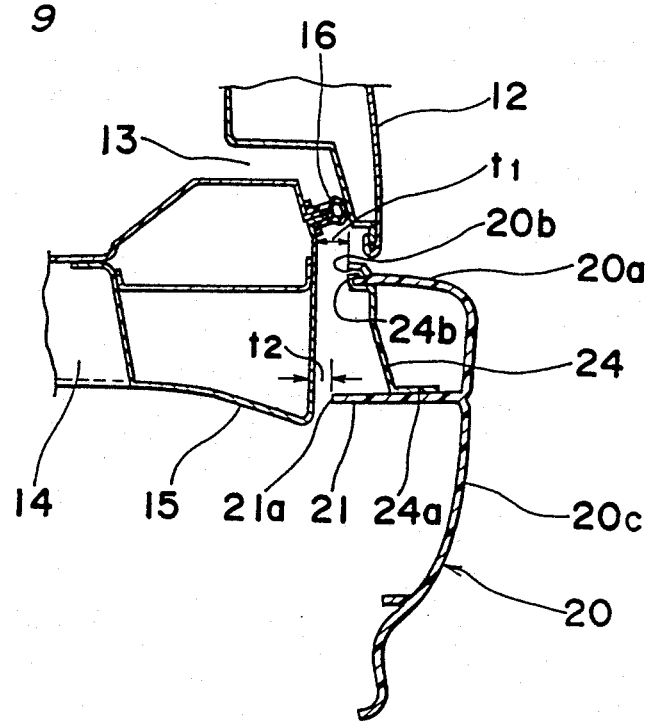
FIGS. 9 and 10 are cross-sectional views, on an enlarged scale, of an automobile rear underbody structure taken along the lines IX13 IX and X—X in FIG. 1, respectively.
Figure 10:
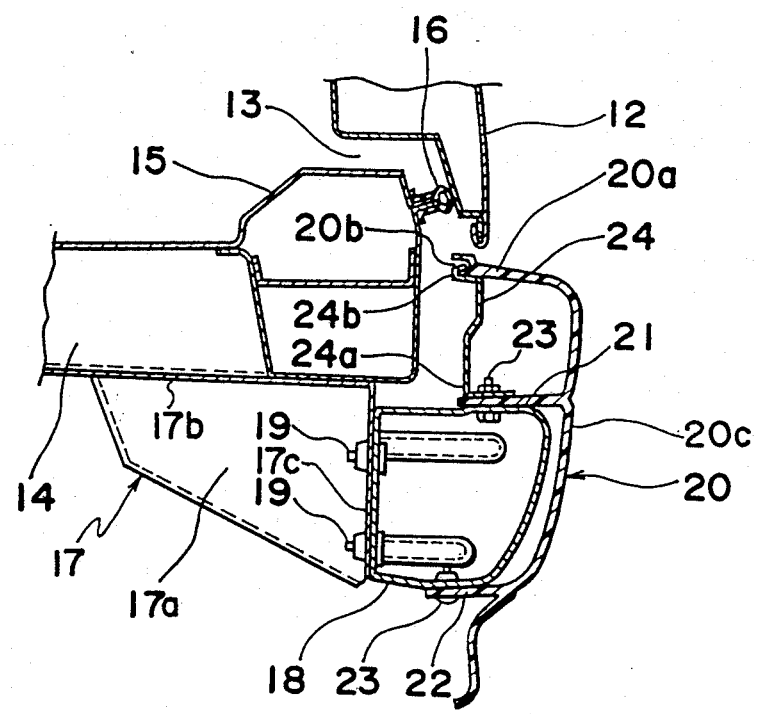

FIGS. 8 to 10 illustrates a second aspect of the present invention which is particularly directed to the design of the rear bumper 20 utilizable in the rear underbody structure according to the embodiment shown in and described with reference to FIGS. 3 to 7. The use of the rear bumper 20 shown in FIGS. 8 to 10 in combination with the rear underbody structure of FIGS. 3 to 5 or FIGS. 6 and 7 is effective to minimize any possible damage to the sealability of the rear access opening, particularly when the impact applied to the rear underbody structure as a result of a rear-end collision is relatively small, for example, of a value which will not result in the buckling of the side frames 14. The impact could alternatively be of a value which would result in the buckling of the side frame 14 if the impact were applied direct thereto, but lessened by the rear bumper 20 to aboid buckling of the side frames 14.

Referring now to FIGS. 8 to 10, while the rear cross member 15 defines the bottom edge of the rear access opening 13, a sealing member 16, which may be secured to either the rear cross member 15 or the lower edge of the rear door assembly 12, is interposed between the rear cross member 15 and a lower edge of the rear door assembly 12 when held in a position to close the rear access opening 13.

The bracket assembly 17 used in the embodiment of FIGS. 8 to 10 and employed for each side frame 14 is of a design having a pair of spaced angle plates 17a, a horizontal panel portion 17b and a vertical panel portion 17c and is carried by the automobile rear underbody structure. The horizontal panel portion 17b is secured from below to the rear end of the associated side frame 14 and to the rear cross member 15 with the vertical panel portion 17c confronting the rear bumper 20.

The rear bumper 20 is of one-piece construction including a generally rectangular bumper body 20c extending laterally of the automobile 10, an upper flange 20a extending from an upper side edge of the bumper body 20c in a direction towards the rear cross member 15, an intermediate flange 21 positioned generally parallel to and beneath the upper flange 21a and extending from a substantially intermediate portion of the bumper body 20c in a direction towards the rear cross member 15, and a lower flange 22 positioned generally parallel to and beneath the intermediate flange 21 and extending from a substantially lower side edge of the bumper body 20c in a direction towards the bracket assemblies 17, all of said bumper body 20c and flanges 20a, 21 and 22 being molded, or otherwise assembled in any suitable manner, together to render the rear bumper 20 to have a cross-section of a shape similar to the shape of a FIG. "3".

The rear bumper 20 of the above described construction carries bumper stays 18 partly accommodated within a space between the intermediate and lower flanges 21 and 22 and bolted or otherwise welded at 23 to the intermediate and lower flanges 21 and 22, as best shown in FIG. 10. These bumper stays 18 are spaced apart from each other so as to align with the associated vertical panel portions 17c of the bracket assemblies 17. The rear bumper 20 is fitted to the rear of the automobile 10 with the bumper stays 18 bolted at 19 to the vertical panel portions 17c of the respective bracket assemblies 17.

In order to avoid any possible downward buckling of the upper flange 20a in a direction towards the intermediate flange 21, a generally rectangular reinforcement member 24 may disposed in a space between the upper and intermediate flanges 20a and 21, the member 24 having a lower side edge 24a bolted at 23 to the intermediate flange 21 and an upper side edge 24b engaged with a free edge 20b of the upper flange 20a in a shake-hand fashion. When this reinforcement member 24 is employed such as shown, the rear extension arms 34 as employed in the foregoing embodiment can be dispensed with. Alternatively, the reinforcement member 24 may have openings defined therein for the passage of the respective rear extension arms 34 therethrough.

In order to minimize the possibility of the sealing member being damaged by a rear-end collision, the rear bumper 20 in accordance with the present invention is so designed that, when the rear bumper 20 has been fitted to the automobile 10 in the manner as hereinabove described, the free edge 20b of the upper flange 20a protruding towards the rear cross member 15 terminates at a location spaced a distance t1 rearwardly from the rear cross member 15, while a free edge 21a of the intermediate flange 21 also protruding towards the rear cross member 15 terminates at a location spaced a distance t2 rearwardly from the rear cross member 15, the distance t1 being greater than the distance t2, as shown in FIG. 9. In other words, as best shown in FIG. 8, while the upper flange 20a has a generally uniform width over the length of the bumper body 20c, the intermediate flange 21 has a varying width over the length of the bumper body 20a such that a substantially intermediate portion of the intermediate flange 21 has a maximum width, which to permits the free edge 21a thereof to be spaced the distance t2 rearwardly from the rear cross member 15.

In operation, when a relatively small load is applied to the rear bumper 20 from the rear as a result of a rear-end collision, the free edge 21a of the intermediate flange 21 is first brought into contact with the rear cross member 15, with the consequence that a lower portion of the rear cross member remote from the position of the sealing member 16 may be deformed inwardly to absorb the impact. At the same time, the intermediate flange 21 may buckle inwards followed by the contact of the free edge 20b of the upper flange 20a with an upper portion of the rear cross member 15 adjacent to the sealing member 15. However, since in most cases the relatively small load may be absorbed by the deformation of that portion of the rear cross member 15 remote from the sealing member 16 and/or the inward buckling of the intermediate flange 21, the contact of the free edge 20b of the upper flange 20a will not result in deformation of that upper portion of the rear cross member 15.

Where the load applied to the rear bumper 20 is relatively great, the deformation of the lower portion of the rear cross member 15 as a result of impingement of the free edge 21a of the intermediate flange 21 is followed by the deformation of the upper portion of the rear cross member 15 as a result of subsequent impingement of the free edge 20b of the upper flange 20a. However, most impact energies applied to the rear bumper 20 are absorbed by the deformation of the lower portion of the rear cross member 15 and also by the inward buckling of the intermediate flange 21, Therefore, the impact actually applied to the upper portion of the rear cross member 15 through the upper flange 20a may be small enough to permit the rear cross member 15 not to be displaced forwardly and also to minimize any possible deformation of the sealing member even through the upper portion of the rear cross member 15 is inwardly deformed.

Figure 11:
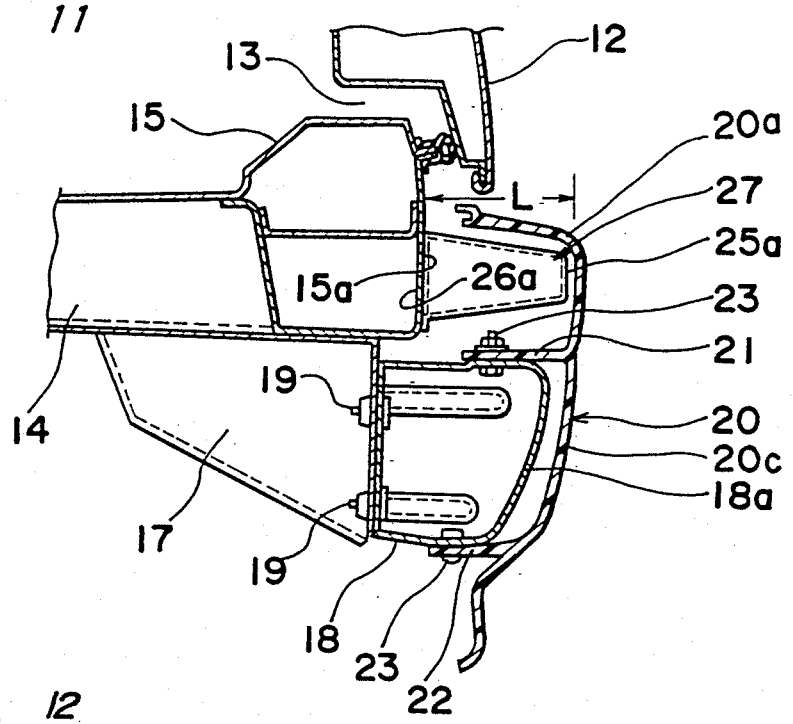
FIGS. 11 is a view similar to FIG. 10, showing the automobile rear underbody structure according to the present invention.

The manner in which the rear bumper 20 shown in FIGS. 8 to 10 is fitted to the rear underbody structure shown in FIGS. 2-7 is substantially as shown in FIG. 11.

However, FIG. 11 also illustrates a third aspect of the present invention, where each rear extension arm 27 secured to the rear end of the associated side frame 14 through the rear cross member 15 extends coaxially and rearwardly from the associated side frame 14 while protruding a distance L into the space delimited by the upper and intermediate flanges 20a and 21 and an upper portion of the bumper body 20c between these flanges 20a and 21.

Figure 12:
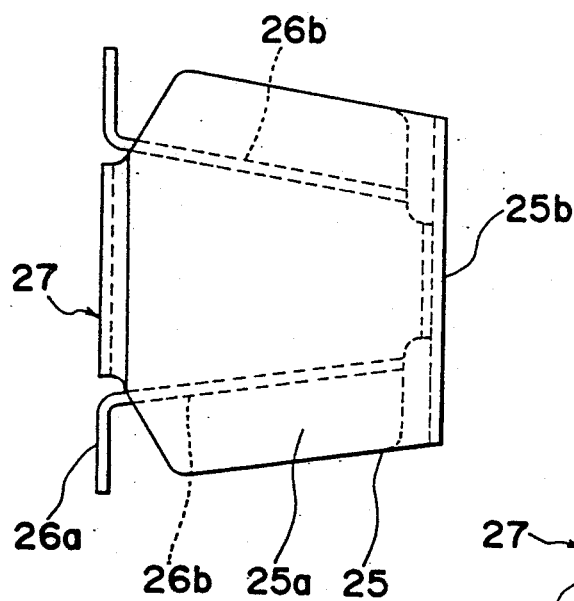
FIGS. 12 and 13 are top plan and side views, respectively, showing each of the rear extension arms shown in FIG. 11.
Figure 13:
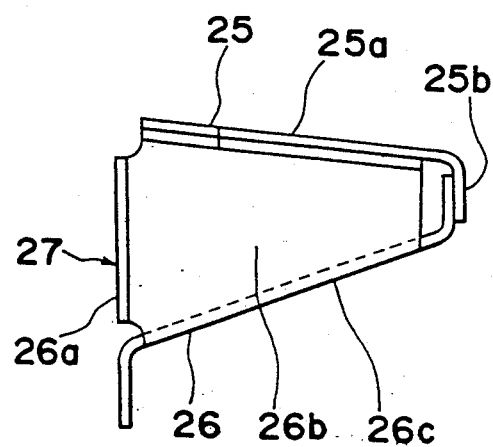

Referring now to FIGS. 12 and 13, the rear extension arm 27, shown in FIG. 11 and used for each side frame 14, is comprised of a first blank plate 25 and a second blank plate 26. The first blank plate 25 is so shaped as to have a top plate portion 25a and a rear end plate portion 25b lying generally at right angles to the top plate portion 25a. The second blank plate 26 is so shaped as to have a bottom plate portion 26c, a pair of side plate portions 26b lying generally transverse to the bottom plate portion 26a and a front end plate portion 26a. These first and second blank plates 25 and 26 are welded together to cause the associated rear extension arm 27 to have a generally box-like configuration of a shape generally similar to a pyramid frustrum, with the top plate portion 25a and the rear end plate portion 25b facing the bottom plate portion 26c and the front end plate portion 26a, respectively.

Each of the rear extension arm 27 of the shape and construction described above is, while axially aligned with the associated side frame 14, fitted to the rear cross member 15 with the front end plate portion 26a rigidly connected to a rear end face 15a of the rear cross member 15 as best shown in FIG. 11 by the use of any known fitting method, for example, a .spot-welding or fillet-welding technique or by the use of any suitable fastening members. It is to be noted that each rear extension arm 27 is so designed and so shaped as to protrude a distance L rearwardly from the rear end face 15a when it has been secured to the rear cross member 15 in the manner described above, which distance L is greater than the distance the bumper stays 18 protrude rearwardly from the associated bracket assembly 17.

According too FIGS. 11 to 13, the position of the rear bumper 20 relative to the automobile rear underbody structure is so selected that the rear bumper 20 may be offset downwardly relative to the rear ends of the side frames 14. Also, the reinforcement member 24 shown in and described with particular reference to FIGS. 9 and 10 may, or may not, be employed. Where the reinforcement member is employed, the reinforcement the case with the previous embodiment, the reinforcement to permit the respective rear extension arms 27 to extend therethrough.

While the automobile rear underbody structure according to FIGS. 11 to 13, in the event of a rear-end collision during which impacts are applied to the rear bumper 20 from the rear, the impacts so applied are first transmitted to the rear extension arms 27 through the rear bumper 20 because the rear extension arms 27 protrude rearwardly a distance L greater than that over which the bumper stays 18 protrude. Accordingly, the noticeable tendency of the side frames 14 to bend if the impacts are transmitted to the side frames 14 through the bumper stays 18 and then through the bracket assemblies 17, can be advantageously minimized. This is particularly true where the side frames 14 extend in a direction lengthwise of the automobile without the rear portions thereof being offset upwardly relative to the front portions.

It is to be noted that, in a broad sense of the present invention, the rear extension arms 27 may not be members separate from the side frames 14 and may be constituted by respective rear end portions of the side frame. Where the rear extension arms 27 are constituted by the rear end portions of the side frames 14, such rear end portions should extend through spaced apart openings defined in the rear cross member 15.

Although the present invention has been fully described in connection with the preferred embodiments thereof with reference to the accompanying drawings, it is to be noted that various changes and modifications are apparent to those skilled in the art. By way of example, each of the rear frame portions referred to above may be a member separate from, and hence rigidly connected to, the associated side frame or sill. Such changes and modifications are to be understood as included within the scope of the present invention as defined by the appended claims, unless they depart therefrom.

We claim:

1. An automobile rear underbody structure, comprising:

a pair of side frames, said side frames being spaced apart from each other and extending in a direction lengthwise of an automobile body structure, each of said side frames having front and rear frame portions with said rear frame portions lying in a level offset upwardly relative to said front frame portions, each of said rear frame portions having a depressed region at a predetermined position thereof to permit said rear frame portions to bend downwardly when an external impact greater than a predetermined value is applied thereto;

a cross member having opposite ends thereof rigidly connected to respective ones of said side frames;

at least two brackets, each of said brackets being secured to an associated one of said side frames and an associated lower portion of said cross member;

at least two stays, each of said stays being secured to an associated one of said brackets;

at least two rear extensions connected to said cross member, said rear extensions being in spaced relation to each other and extending rearwardly of said cross member; and a rear bumper connected to said stays and held in a position offset downwardly relative to said cross member.

2. A structure as in claim 1, wherein said rear extensions are covered by said rear bumper.

3. A structure as in claim 2, wherein each of said rear extensions extends rearwardly beyond said stays.

4. A structure as in claim 3, wherein each of said rear extensions has a generally rectangular cross-section, the surface area of said cross-section progressively decreasing rearwardly of said cross member.

5. A structure as in claim 1, wherein each of said side frames includes at least one side wall with a guide bead defined therein at a portion of said side wall within said depressed region.

6. A structure as in claim 1, wherein each of said side frames includes a bottom face with reinforcement plate means disposed thereon and extending in said lengthwise direction.

7. A structure as in claim 1, further comprising at least two anchor plates secured to associated ones of said brackets.

8. A structure as in claim 1, wherein said cross member includes a rear wall and said rear extensions are connected to, and extend rearwardly from, portions of said rear wall.

9. A structure as in claim 8, further comprising a plurality of reinforcement members within said cross member at associated ones of said portions.

10. A structure as in claim 9, wherein said portions correspond to said opposite ends.

11. A structure as in claim 1, wherein said cross member includes a front wall and a rear wall, and said rear extensions are connected to said front wall and extend through said rear wall.

12. An automobile rear underbody structure, comprising:

frame means extending in a direction generally lengthwise of an automobile body structure, said frame means having front and rear frame portions with said rear frame portion lying in a level offset upwardly relative to said front frame portion, said rear frame portion having a depressed region at a predetermined intermediate position thereof to permit said rear frame portion to bend downwardly when an external impact greater than a predetermined value is applied thereto;

a cross member having opposite ends thereof rigidly connected to said frame means; and a rear bumper connected to said cross member, said rear bumper including an upper front edge, an inner face and a reinforcement flange extending forward from said inner face and ending at a free edge, said free edge being spaced from the automobile body structure a distance less than that by which said upper front edge is spaced from the automobile body structure.

13. An automobile rear underbody structure comprising:

a pair of side frames, said side frames being spaced apart and extending in a direction generally lengthwise of an automobile body structure, each of said side frames having front and rear frame portions, said rear frame portions lying in a level offset upwardly relative to said front frame portions, each of said rear frame portions having a depressed region defined at a predetermined position thereof and lying in a level offset downwardly relative to said rear frame portions to permit said rear frame portions to bend downwardly when an external impact greater than a predetermined value is applied thereto;

a cross member having opposite ends thereof rigidly connected to said side frames;

a rear bumper secured to said cross member and held in a position offset downwardly relative to said cross member;

at least two brackets, each of said brackets being secured to an associated one of said side frames and an associated lower portion of said cross member;

at least two stays, each of said stays being secured to an associated one of said brackets, said rear bumper being secured to said cross member via said stays; and at least two rear extensions connected to said cross member, said rear extensions being in spaced relation to each other and extending rearwardly of said cross member.

14. A structure as in claim 13, further comprising at least two anchor plates secured to associated ones of said brackets.

15. A structure as in claim 13, wherein said cross-member includes a front wall and a rear wall, and said rear extensions are connected to said front wall and extend through said rear wall.

16. A structure as in claim 13 wherein said rear extensions are covered by said rear bumper.

17. A structure as in claim 16, wherein each of said rear extensions extends rearwardly beyond said stays.

18. A structure as in claim 17, wherein each of said rear extensions has a generally rectangular cross-section, the surface area of said cross-section progressively decreasing rearwardly of said cross member.

19. A structure as in claim 13, wherein said cross-member includes a rear wall and said rear extensions are connected to, and extend rearwardly from, portions of said rear wall.

20. A structure as in claim 19, further comprising a plurality of reinforcement members within said cross member at associated ones of said portions.

21. A structure as in claim 20, wherein said portions correspond to said opposite ends.

22. An automobile rear underbody structure comprising:
- a pair of side frames, said side frames being spaced apart and extending in a direction generally lengthwise of an automobile body structure, each of said side frames having front and rear frame portions, said rear frame portions lying in a level offset upwardly relative to said front frame portions, each of said rear frame portions having a depressed region defined at a predetermined position thereof and lying in a level offset downwardly relative to said rear frame portions to permit said rear frame portions to bend downwardly when an external impact greater than a predetermined value is applied thereto;
- a cross member having opposite ends thereof rigidly connected to said side frames; and
- a rear bumper secured to said cross member, said rear bumper including an inner face and a reinforcement flange extending forward from said inner face, and
- a forward edge of said reinforcement flange is a free edge and is spaced from the automobile body structure a distance smaller than that by which an upper front edge of the rear bumper is spaced from the automobile body structure.

23. An automobile rear underbody structure, comprising:
- frame means extending in a direction generally lengthwise of an automobile body structure, said frame means having side wall means and front and rear frame portions with said rear frame portion lying in a level offset upwardly relative to said front frame portion, said rear frame portion having a depressed region at a predetermined position thereof to permit said rear frame portion to bend downwardly when an external impact greater than a predetermined value is applied thereto;
- guide bead means defined in said side wall means in a portion thereof encompassed by said depressed region; and
- reinforcement plate means fixed to said frame means and extending in said lengthwise direction, said reinforcement plate means including at least one cutout region generally contoured to accommodate said guide bead means in an area of said reinforcement plate means proximate said guide bead means.

24. A structure as in claim 23, wherein said depressed region lies in a level offset downwardly relative to said rear frame portion.

25. An automobile rear underbody structure, comprising:
- a pair of side frames, said side frames being spaced apart from each other and extending in a direction lengthwise of an automobile body structure, each of said side frames having at least one side wall and having front and rear frame portions with said rear frame portions lying in a level offset upwardly relative to said front frame portions, each of said rear frame portions having a depressed region at a predetermined position thereof to permit said rear frame portions to bend downwardly when an external impact greater than a predetermined value is applied thereto;
- a guide bead defined in each of said side walls in a portion thereof encompassed by said depressed region;
- a frame reinforcement connected to each of said side frames, each of said frame reinforcements extending in a direction lengthwise of an associated one of said side frames and being spaced from said guide bead, each said frame reinforcement having a generally U-shaped cross-section and a cutout region generally contoured to accommodate said guide bead, said cutout region constituting said frame reinforcement being spaced from said guide bead; and
- a cross member having opposite ends thereof rigidly connected to respective rear ends of said side frames.

26. A structure as in claim 25, further comprising a rear bumper secured to said cross member.

27. A structure as in claim 25, wherein said rear bumper is held in a position offset downwardly relative to said cross member.

28. A structure as in claim 27, further comprising at least two brackets, each of said brackets being secured to an associated one of said side frames and a lower portion of said cross member; and at least two stays, each of said stays being secured to an associated one of said brackets, said rear bumper being secured to said cross member via said stays.

29. A structure as in claim 25, wherein said depressed region is located at a rear end portion of said rear portion and said guide bead is located substantially at the mid-point of said depressed region.

30. An automobile rear underbody structure, comprising:
- a pair of side frames, said side frames being spaced apart from each other and extending in a direction lengthwise of an automobile body structure, each of said side frames having at least one side wall and having front and rear frame portions with said rear frame portions lying in a level offset upwardly relative to said front frame portions, each of said rear frame portions having a depressed region at a predetermined position thereof to permit said rear frame portions to bend downwardly when an external impact greater than a predetermined value is applied thereto;
- a guide bead defined in each of said side walls substantially at the mid-point of said depressed region; and
- a cross member having opposite ends thereof rigidly connected to respective rear ends of said side frames.

* * * * *